United States Patent
Oyaizu et al.

(10) Patent No.: US 7,606,993 B2
(45) Date of Patent: Oct. 20, 2009

(54) FLASH MEMORY CONTROLLER, MEMORY CONTROL CIRCUIT, FLASH MEMORY SYSTEM, AND METHOD FOR CONTROLLING DATA EXCHANGE BETWEEN HOST COMPUTER AND FLASH MEMORY

(75) Inventors: Tsuyoshi Oyaizu, Tokyo (JP); Yukio Terasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 70 days.

(21) Appl. No.: 10/794,480

(22) Filed: Mar. 4, 2004

(65) Prior Publication Data

US 2004/0255076 A1 Dec. 16, 2004

(30) Foreign Application Priority Data

Jun. 10, 2003 (JP) .............................. 2003-165656

(51) Int. Cl.
*G06F 12/00* (2006.01)
(52) U.S. Cl. ........................... 711/203; 710/52; 710/53; 711/103; 711/202
(58) Field of Classification Search .................. 710/52, 710/53; 711/103, 202, 203
See application file for complete search history.

(56) References Cited

U.S. PATENT DOCUMENTS 5,404,485 A * 4/1995 Ban ............................ 711/202
6,779,062 B1 * 8/2004 Eschmann et al. ............ 710/74
2002/0034096 A1 * 3/2002 Rosner et al. ................ 365/173
2003/0091324 A1 * 5/2003 Tominaga ..................... 386/46

FOREIGN PATENT DOCUMENTS

| JP | 05158782 | 6/1993 |
|---|---|---|
| JP | 07028700 | 1/1995 |
| JP | 09-249902 | 9/1997 |
| JP | 2001-323301 | 11/2001 |
| JP | 2002-088403 | 3/2002 |
| JP | 2002312232 | 10/2002 |
| JP | 2002-328836 | 11/2002 |
| JP | 2002328836 | 11/2002 |
| JP | 2002366429 | 12/2002 |
| JP | 2003091463 | 3/2003 |
| JP | 2003-303728 | 10/2003 |

* cited by examiner

*Primary Examiner*—Sanjiv Shah
*Assistant Examiner*—Jae U Yu
(74) *Attorney, Agent, or Firm*—Townsend and Townsend and Crew LLP

(57) ABSTRACT

A controller included in a flash memory system, which can be applied to a memory interface of a host computer is disclosed. A buffer is used for data exchange operation between the host computer and the controller, and data exchange operation between a flash memory and the controller. A host interface control block as a first control block controls data exchange operation between the buffer and the host computer. A flash sequencer block as a second control block controls data exchange operation between the buffer and the flash memory. The host interface control block controls input and output operation of the buffer, based on a memory control signal and a memory address signal supplied from the host computer. The flash sequencer block controls input and output operation of the buffer at a one-page size of the flash memory.

12 Claims, 11 Drawing Sheets

FLASH MEMORY CONTROLLER, MEMORY CONTROL CIRCUIT, FLASH MEMORY SYSTEM, AND METHOD FOR CONTROLLING DATA EXCHANGE BETWEEN HOST COMPUTER AND FLASH MEMORY

BACKGROUND OF THE INVENTION

1. Field of the Invention

The present invention relates to a flash memory controller, a memory control circuit that includes the controller, a flash memory system, and a method for controlling data exchange between a host computer and a flash memory.

2. Description of the Related Art

In recent years, flash memories are widely adopted in semiconductor memories used in memory systems, such as memory cards and silicon disks. The flash memory is a kind of nonvolatile memory. Data stored in the flash memory is requested to be maintained, even when electric power is not supplied.

A NAND type flash memory is a kind of flash memory that is especially used in the above memory systems. Each of the plurality of memory cells included in the NAND type flash memory can be changed from an erasing state, where data indicating a logical value of "1" is stored, to a writing state, where data indicating a logical value of "0", independent from other memory cells. In contrast, in a case where at least one memory cell from a plurality of memory cells, must be changed from a writing state to an erasing state, each memory cell can not change, independently from the other memory cells. At this time, in a predetermined number of memory cells, referred to as blocks, all the memory cells must become an erasing state at the same time. This total erasing operation is generally referred to as "block erasing".

The reason why flash memories have the characteristic described above, is because it was assumed that flash memories would be handled in the same way as hard disk drives (HDD) in a computer system. A flash memory system that adopted a flash memory having this characteristic is ordinarily in conformity with standards of HDD, such as ATA (Advanced Technology Attachment). Therefore, in a computer system that has the above flash memory connected to a host computer, the host computer handles the flash memory system in the same way as an ordinary HDD.

However, a flash memory system in conformity with standards of HDD can not be connected to a host computer that does not have a specific interface adapted for HDD standards. In a case where a control circuit for controlling a flash memory is independent from the flash memory itself, there are cases where it is convenient to apply the control circuit to the memory interface of the host computer.

A controller which makes pseudo access possible, such as access to a direct volatile memory from outside, in accordance with instructions from an external bus, when data transferring is not carried out, is disclosed in Unexamined Japanese Patent Application KOKAI Publication No. 2002-328836. The controller disclosed in this reference can record data read from a flash memory, to RAM, and the RAM has a storage capacity corresponding to a few pages in a NAND type flash memory. As opposed to the aforementioned art, it is desirable to provide an easier structure for flexible access from a host computer to a flash memory.

SUMMARY OF THE INVENTION

The object of the present invention is to provide a flash memory controller that can be applied to a memory interface of a host computer, a memory control circuit that can applied to the controller, a flash memory system, and method for controlling data exchange between the host computer and the flash memory.

A flash memory controller according to a first aspect of the present invention comprises:

a buffer used for exchanging data with a host computer and a flash memory;

a first control block which controls data exchange operation between the buffer and the host computer, based on control signals and address signals supplied from the host computer, and a second control block which controls data exchange operation between the buffer and the flash memory, in a one-page size of the flash memory.

Further, the flash memory controller may comprise at least one information memory that can be accessed by the host computer, wherein the second control block may control data exchange operation between the buffer and the flash memory, based on information set in the information memory.

At least one address included in a memory address space or an I/O address space of the host computer, may be allotted individually to the information memory.

Data capacity of the buffer may be one-page size of the flash memory; and addresses included in memory address space of the host computer may be allotted corresponding to one-page size of the flash memory, to said buffer.

The second control block may sequentially read data for transferring to the flash memory from the buffer, in an order from start address to end address of the buffer, when data stored in the buffer is written to the flash memory; and the second control block may sequentially write data transferred from the flash memory to the buffer, in an order from start address to end address of the buffer, when data read from the flash memory is stored in the buffer.

The first control block may provide the host computer with random access to stored data of the buffer.

The buffer may include a plurality of data regions that has a plurality of addresses allotted individually; wherein the first control block may write data indicated by data signals supplied from the host computer to data regions that have addresses designated by address signals supplied from the host computer, when data supplied from the host computer is stored in the buffer; and the first control block may read stored data from data regions that have addresses designated by address signals supplied from the host computer, to output data signals to the host computer, when data stored in the buffer is transferred to the host computer.

A memory control circuit according to a second aspect of the present invention comprises:

a main processor;

a buffer used for data exchange between the main processor and an external flash memory;

a first controller which controls data exchange between the buffer and the main processor, based on control signals and address signals supplied from the main processor; and a second controller which controls data exchange between the buffer and the flash memory, at a one-page size of the flash memory.

The memory control circuit may further comprise at least one information memory, which can be accessed by the main processor, wherein the second controller may control data exchange between the buffer and the flash memory, based on information set in the information memory, by the main processor.

At least one address included in a memory address space or an I/O address space of said main processor may be allotted individually to the information memory.

Data capacity of the buffer may be one-page size of the flash memory; and addresses included in memory address space of the main processor may be allotted, corresponding to one-page size of the flash memory, to the buffer.

The second controller may sequentially read data for transferring to the flash memory from the buffer, in an order from start address to end address of the buffer, when data stored in the buffer is output to the memory; and the second controller may sequentially write data transferred from the flash memory to the buffer, in an order from start address to end address of the buffer, when data input by the flash memory is stored in the buffer.

The first controller may provide the main processor with random access to stored data of the buffer.

The buffer may include a plurality of data regions that has a plurality of addresses allotted individually;

the first controller may write data indicated by data signals supplied from the main processor, to data regions that have addresses designated by address signals supplied from the main processor, when data supplied from the main processor is stored in the buffer; and the first controller may read stored data from data regions that have addresses designated by address signals supplied from the main processor, to output data signals to the main processor, when data stored in the buffer is transferred to the main processor.

A flash memory system according to a third aspect of the preset invention comprises:

a flash memory that has a memory space allotted to a plurality of pages;

a buffer used for data exchange between an external host computer and the flash memory;

a first control block which controls data exchange between the buffer and the host computer, based on control signals and address signals supplied from the host computer; and a second control block which controls data exchange between the buffer and the flash memory, in a one-size page of the flash memory.

The flash memory system may further comprise at least one information memory which can be accessed by the host computer, wherein the second control block may control data exchange between the buffer and the flash memory, based on information set in the information memory.

At least one address included in a memory address space or an I/O address space of the main processor may be allotted individually to the information memory.

Data capacity of the buffer may be one-page size of the flash memory; and addresses included in memory address space of the main processor may be allotted, corresponding to one-page size of the flash memory, to the buffer.

The second control block may sequentially read data for transferring to the flash memory from the buffer, in an order from start address to end address of the buffer, when data stored in the buffer is written to the memory; and the second control block may sequentially write data transferred from the flash memory to the buffer, in an order from start address to end address of the buffer, when data read from the flash memory is stored in the buffer.

The first control block may provide the host computer with random access to stored data of the buffer.

The buffer may include a plurality of data regions that has a plurality of addresses allotted individually;

the first control block may write data indicated by data signals supplied from the host computer to data regions that have addresses designated by address signals supplied from the host computer, when data supplied from the host computer is stored in the buffer; and the first control block may read stored data from data regions that have addresses designated by address signals supplied from the host computer, to output data signals to the host computer, when data stored in the buffer is transferred to the host computer.

A method for controlling data exchange between a host computer and a flash memory, according to a fourth aspect of the present invention, comprises:

a first control step of controlling data exchange between the host computer and a buffer whose data capacity is one-page size of the flash memory, by a first controller, based on control signals and address signals supplied from the host computer; and a second control step of controlling data exchange between the buffer and the flash memory, in a one-page size of the flash memory, by a second controller.

The second control step may include:

sequentially reading data for transferring to the flash memory from the buffer, in an order from a start address to an end address of the buffer, by the second controller, when data stored in the buffer is written into the flash memory; and sequentially writing data transferred from the flash memory to the buffer, in an order from a start address to an end address of the buffer, by the second controller, when data read from the flash memory is stored in the buffer.

The buffer may include a plurality of data regions that have a plurality of addresses individually allotted; and the first control step may include writing data indicated by data signals supplied from the host computer to data regions that have addresses designated by address signals supplied from the host computer, by the first controller, when data supplied from the host computer is stored in the buffer, and reading stored data from data regions that have addresses designated by address signals supplied from the host computer, for outputting data signals to the host computer by the first controller, when data stored in the buffer is transferred to the host computer.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
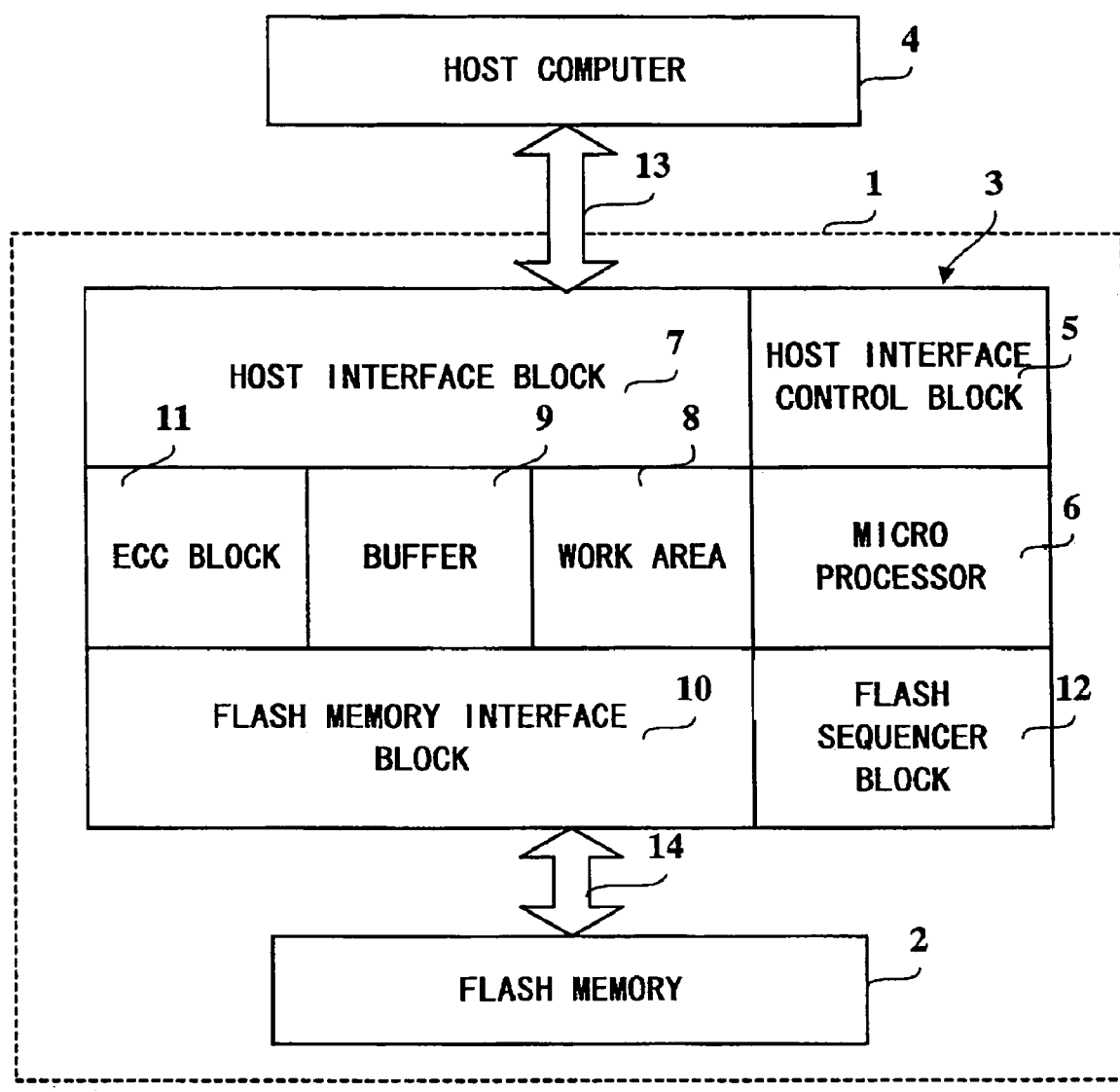
FIG. 1 is a block diagram of a flash memory system according to the present invention.

FIG. 1 is a block diagram that schematically shows a flash memory system 1 according to the present invention. The flash memory system 1 comprises a flash memory 2 and a controller 3. The flash memory system 1 can be applied to a memory interface that a host computer 4 includes. For example, the host computer 4 is a main processor, such as a CPU (Central Processing Unit).

Figure 2:
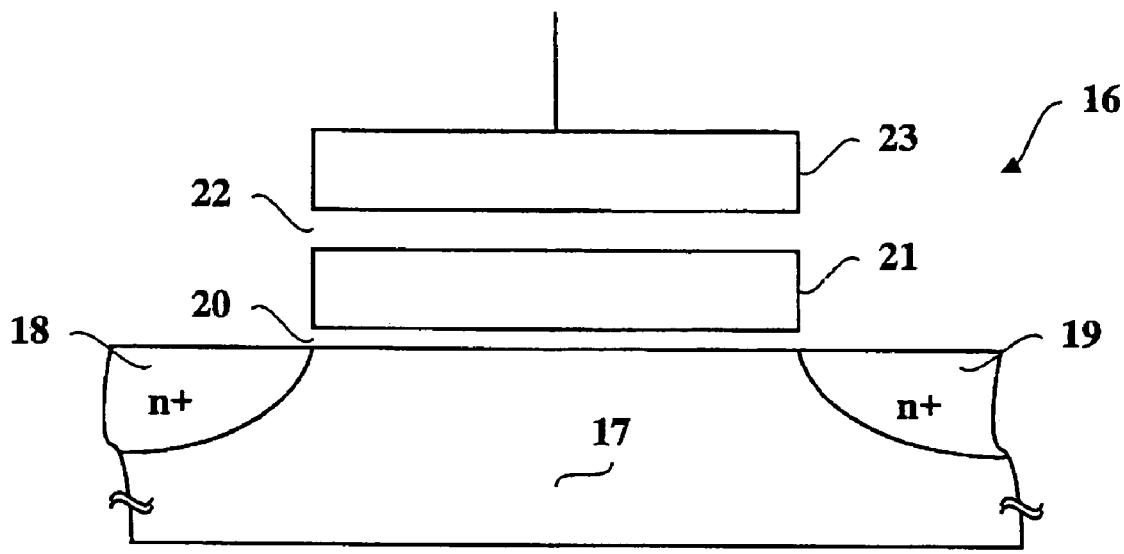
FIG. 2 is a cross-sectional view schematically showing a structure of a memory cell.
Figure 3:
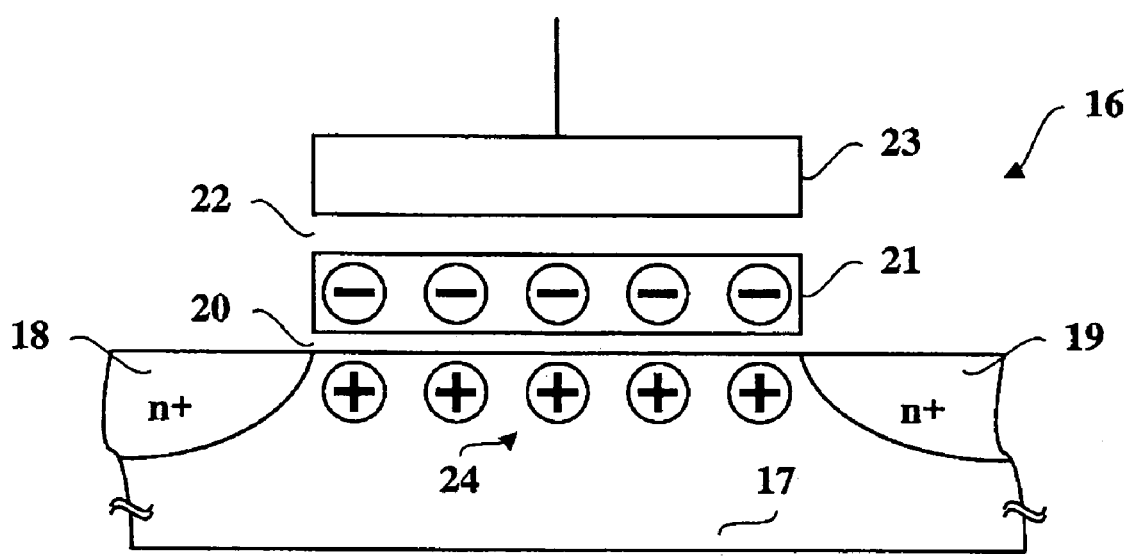
FIG. 3 is a cross-sectional view of a memory cell in a writing state.

The flash memory 2 shown in FIG. 1 is a nonvolatile memory. In the flash memory 2, data reading operation and data writing operation are carried out in what is called page units. On the other hand, data stored in the flash memory 2 are erased in what is called block units. FIGS. 2 and 3 are cross-sectional views schematically showing a structure of a memory cell 16 included in the flash memory 2. In FIG. 2, data is not written into the memory cell 16. In FIG. 3, data is written into the memory cell 16.

As shown in FIGS. 2 and 3, the memory cell 16 includes a p-type semiconductor substrate 17, an n-type source diffusion region 18, an n-type drain diffusion region 19, a tunnel oxide film 20, a floating gate electrode 21, an insulating film 22, and a control gate electrode 23. The source diffusion region 18 and the drain diffusion region 19 are formed on the p-type semiconductor substrate 17. The tunnel oxide film 20 coats the p-type semiconductor substrate 17, between the source diffusion region 18 and the drain diffusion region 19. The floating gate electrode 21 is formed on the tunnel oxide film 20. The insulating film 22 is formed on the floating gate electrode 21. The control gate electrode 23 is formed on the insulating layer 22. A plurality of memory cells are connected serially, at the flash memory 2. One memory cell 16 stores data of one bit.

As shown in FIG. 2, when electrons are not accumulated in the floating gate electrode 21, the memory cell 16 is in an erasing state. On the other hand, when electrons are accumulated in the floating gate electrode 21, the memory cell 16 is in a writing state. The memory cell 16 in the erasing state stores data indicating a logical value "1". The memory cell 16 in the writing state stores data indicating a logical value "0".

In a case where reading voltage, which is pre-set for reading data stored in the memory cell 16, is not applied to the control gate electrode 23 of the memory cell 16 that is not in the erasing state, a channel is not formed on the surface of the p-type semiconductor substrate 17, between the source diffusion region 18 and the drain diffusion region 19. Therefore, the source diffusion region 18 and the drain diffusion region 19 are electrically-isolated.

On the contrary, in a case where reading voltage is applied to the control gate electrode 23 of the memory cell 16 that is in the erasing state, a channel (not shown) is formed on the surface of the p-type semiconductor substrate 17, between the source diffusion region 18 and the drain diffusion region 19. The source diffusion region 18 and the drain diffusion region 19 are electrically connected by the channel.

As described above, in a case where reading voltage is not applied to the control gate electrode 23 of the memory cell 16 that is not in the erasing state, the source diffusion region 18 and the drain diffusion region 19 are electrically-isolated. In a case where reading voltage is applied to the control gate electrode 23 of the memory cell 16 that is in the erasing state, the source diffusion region 18 and the drain diffusion region 19 are electrically connected.

As shown in FIG. 3, when electrons are accumulated to the floating gate electrode 21, the memory cell 16 is in a writing state. The floating gate electrode 21 is in between the tunnel oxide film 20 and the insulating film 22. Therefore, once the electrons are injected to the floating gate electrode 21, the electrons stay in the floating gate electrode 21 for an extremely long time, due to electric potential barrier. A channel 24 is formed on the surface of the semiconductor substrate 17, between the source diffusion region 18 and the drain diffusion region 19, no matter whether the reading voltage is applied or not to the control gate electrode 23. Therefore, in a case where the memory cell 16 is in the writing state, the source diffusion region 18 and the drain diffusion region 19 are electrically connected, no matter whether reading voltage is applied or not to the control gate electrode 23.

Data reading operation for specifying whether the memory cell 16 is in an erasing state or a writing state, will be described. A plurality of memory cells 16 are serially connected in the flash memory 2. One of the plurality of memory cells 16 is selected by the controller 3, for reading stored data. A predetermined low-level voltage is applied to the control gate 23 that is fixed on the selected one memory cell 16. On the other hand, a predetermined high-level voltage (reading voltage) is applied to the control gates 23 that are fixed on the non-selected memory cells 16, wherein the high-level voltage is higher than the low-level voltage. In this situation, it is detected whether the series of memory cells 16 conduct or not, by a predetermined detector. In a case where the detector detects conduction, the selected memory cell 16 is in a writing state. In a case where the detector detects non-conduction, the selected memory cell 16 is in an erasing state. As above, the flash memory 2 is designed to read out stored data indicating a logical value of "0" or "1" from one arbitrary memory cell 16 of the series of memory cells 16 connected serially.

When changing the state of the memory cell 16 between the erasing state and the writing state, an erasing voltage or a writing voltage, which are larger than the voltage used in data reading operation of the memory cell 16, is used. When changing a memory cell 16 that is in an erasing state to a writing state, a writing voltage is applied to the control gate electrode 23, so that the electric potential of the control gate electrode 23 becomes higher than the electric potential of the floating gate electrode 21. By this writing voltage, an FN (Fowler-Nordheim) tunnel current flows between the p-type semiconductor substrate 17 and the floating gate electrode 21 via the tunnel oxide film 20. As a result, electrons are injected to the floating gate electrode 21. On the other hand, when changing a memory cell 16 that is in a writing sate to an erasing state, erasing voltage is applied to the control gate electrode 23, so that the electric potential of the control gate electrode 23 becomes smaller than the electric potential of the floating gate electrode 21. By this erasing voltage, electrons accumulated at the floating gate electrode 21 are emitted from the p-type semiconductor substrate 17 via the tunnel oxide film 20.

Figure 4:
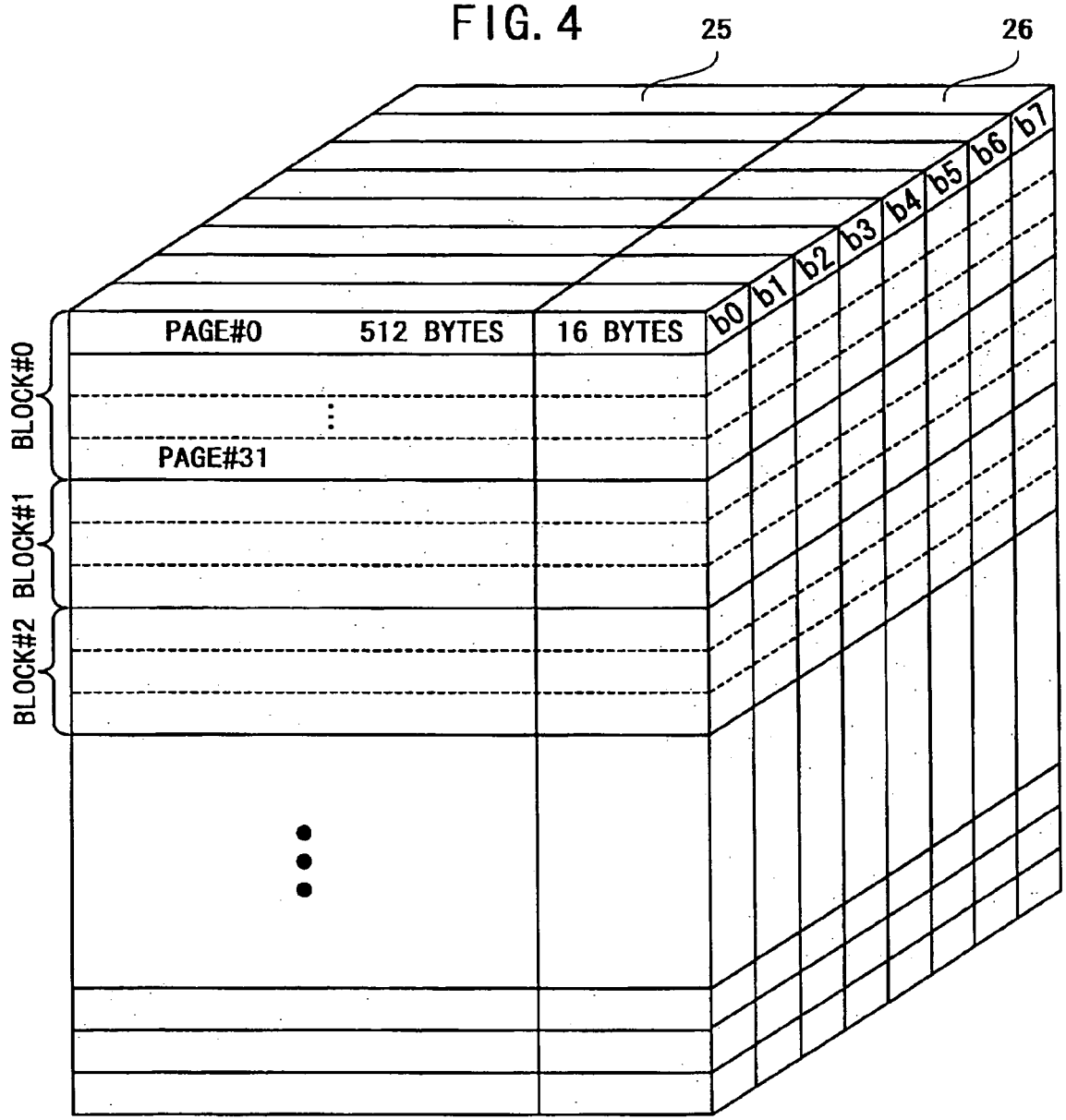
FIG. 4 is a schematic diagram of an address space in a flash memory.

The structure for storing data in the flash memory 2 will be described. FIG. 4 schematically shows address space of the flash memory 2. In the structure shown in FIG. 4, the address space of the flash memory 2 is divided based on "pages" and "blocks". Page is a processing unit in data reading operation and data writing operation carried out in the flash memory 2. Block is a processing unit in data erasing operation carried out in the flash memory 2.

One page includes a data region 25 of 512 bytes, and a redundant region 26 of 16 bytes. The data region 25 stores user data supplied from the host computer 4. The redundant region 26 stores additional information such as Error Correction Code (ECC) generated by an ECC block 11. The error correction code is one of the additional information, and is used for correcting errors included in the data stored in the corresponding data region 25. In a case where the number of errors included in the data stored in the data region 25 is equal to or lower than a predetermined threshold value, those errors can be corrected by the error correction code. At this time, data read from the data region 25 is corrected to correct data by the error correction code.

The redundant region 26 stores "corresponding logic block address" other than the error correction code. In a case where effective data is stored in at least one data region 25 included in one block, the corresponding logic block address shows the address of the logic block corresponding to that block. The logic block address is determined based on a host address provided by the host computer 4. On the other hand, actual block address in the flash memory 2, is referred to as a physical block address.

In a case where effective data is not stored in every data region 27 included in one block, corresponding logic block address is not stored in the redundant region 26 included in that block. Therefore, by determining whether or not corresponding logic block address is stored in the redundant region 26, it can be determined whether data is erased or not in the block including that redundant region 26. In a case where corresponding logic block address is not stored in the redundant region 26, the block that includes the redundant region 26 is in a state where data is erased.

One block includes thirty-two pages. With the flash memory, overwriting of data can not be carried out. Therefore, even if only the data stored in one page is to be re-written, data stored in every page of that one block must be re-written. After at least one part of the data read out from every page of the one block, is changed, the data must be written into one of the erased blocks, in block units.

As above, when re-writing data, the re-written data is written into a block different from the block that the data was stored before. Therefore, the correspondence between the logic block address and the physical block address dynamically changes each time data is re-written in the flash memory 2. The correspondence between the logic block address and the physical block address is listed in an address conversion table. The address conversion table is stored in a work area 8 shown in FIG. 1. In the address conversion table, each time data is re-written in the flash memory 2, storing information corresponding to the re-written block is updated.

In FIG. 1, the controller 3 comprises a host interface control block 5, a micro processor 6, a host interface block 7, a work area 8, a buffer 9, a flash memory interface block 10, an ECC block 11, and a flash sequencer block 12. For example, the controller 3 is integrated on one semiconductor chip.

The functions of each part of the controller 3 will be described. The host interface control block 5 is a first control block for controlling operation of the host interface block 7. The micro processor 6 is a function block for controlling the entire operation of the controller 3.

The host interface block 7 is a function block for exchanging data, address, and other information indicating instructions, etc., with the host computer 7, under the control of the micro processor 6. When the flash memory system 1 is applied to the host computer 4, the flash memory system 1 and the host computer 4 are connected to each other via an external bus 13. Information supplied to the flash memory system 1 from the host computer 4, is loaded to the interior of the controller 3 through the host interface block 7. Information supplied to the host computer 4 from the flash memory system 1 is output to the host computer 4 through the host interface block 7.

The work area 8 is a memory module for temporarily storing data used for controlling the flash memory 2. For example, the work area 8 includes a plurality of SRAM (Static Random Access Memory) cells.

The buffer 9 is a function block for maintaining data read from the flash memory 2 and data to be written to the flash memory 2. The data read from the flash memory 2 is maintained in the buffer 9 until it is output to the host computer 4. The data to be written into the flash memory 2 is maintained in the buffer 9, until the flash memory 2 is ready for data writing operation.

The flash memory interface block 10 is a function block for exchanging information indicating data, address, status, and internal command, etc., with the flash memory 2 via an internal bus 14. The internal command is a command provided to the flash memory 2 from the controller 3.

The ECC block 11 is a function block for generating error correction code added to writing data to the flash memory 2. Additionally, the ECC block 11 carries out detection and correction of the errors included in reading data, based on error correction code included in data read out from the flash memory 2.

The flash sequencer block 12 is a second control block for controlling operation of the flash memory 2, based on the internal command. The flash sequencer block 12 sets the information used when the internal command is carried out, to a plurality of resistors. After information is set to the plurality of resistors, the flash sequencer block 12 carries out operation in accordance with the internal command, based on the information set in each resistor.

Processing for reading out data from the flash memory 2 to the buffer 9, and processing for writing in data from the buffer 9 to the flash memory 2 will be described.

Figure 5:
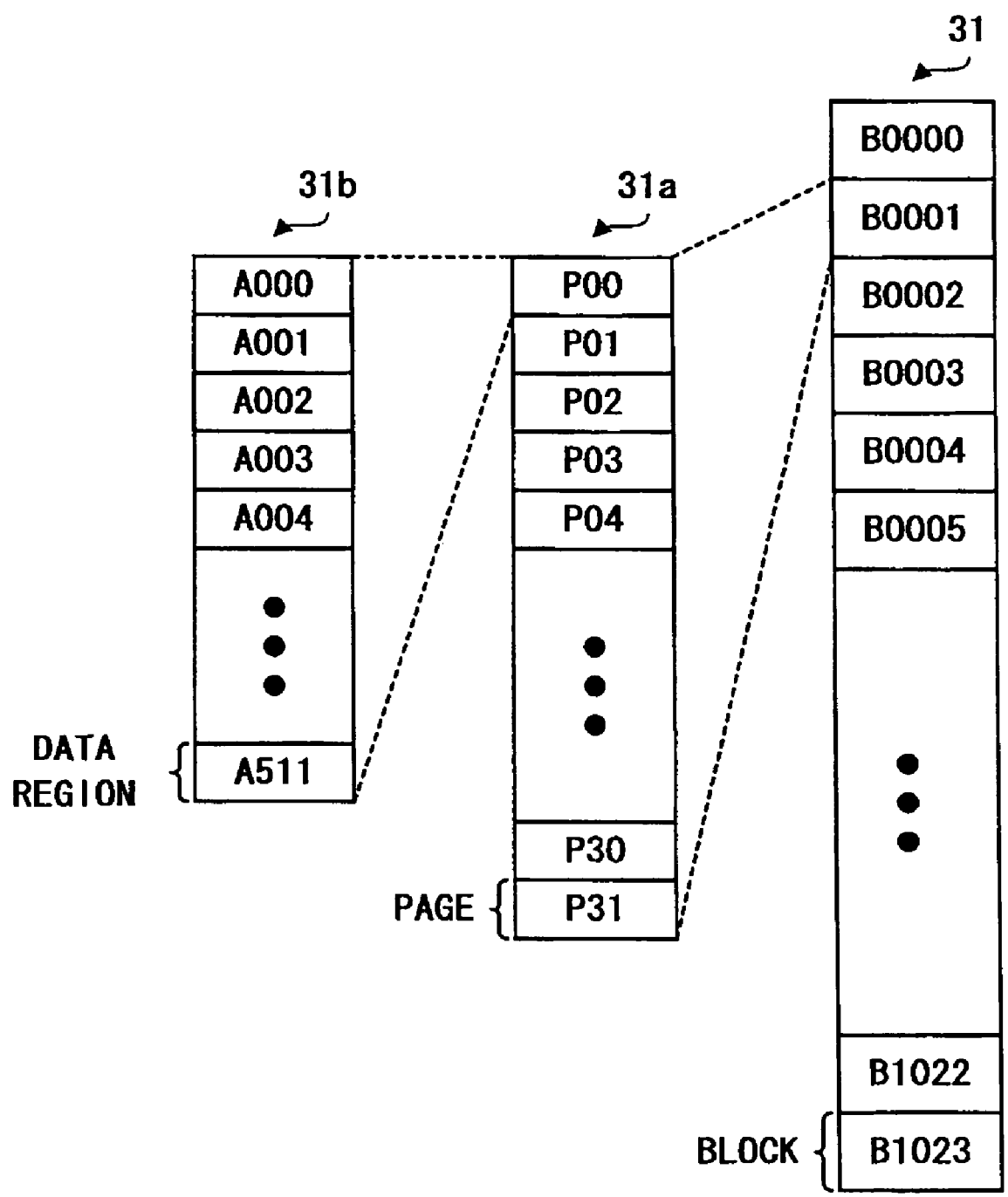
FIG. 5 is a schematic diagram of an allotment example of blocks and pages in a memory space in a flash memory.

FIG. 5 shows an allotment example of blocks and pages in a memory space 31 of the flash memory 2. As shown in FIG. 5, the memory space 31 is divided into a plurality of blocks 31a (B0000 to B1023), wherein each block is a batch processing unit in data erasing. Each block 31a is divided to a plurality of pages 31b (P00 to P31), wherein each page is a batch processing unit in data reading operation and data writing operation. Each page 31b is divided into 512 data regions (A000 to A511), wherein each data region is one byte.

The 1024 blocks 31a (B0000 to B1023) are managed as one zone. When the flash memory 2 includes a plurality of memory spaces 31, at least one erased block is secured for making writing of data possible, in each zone that corresponds to each memory space 31. Below, an erased block set possible to write in data is referred to as a writing candidate. In the data writing operation, data is written into a writing candidate block.

Figure 6:
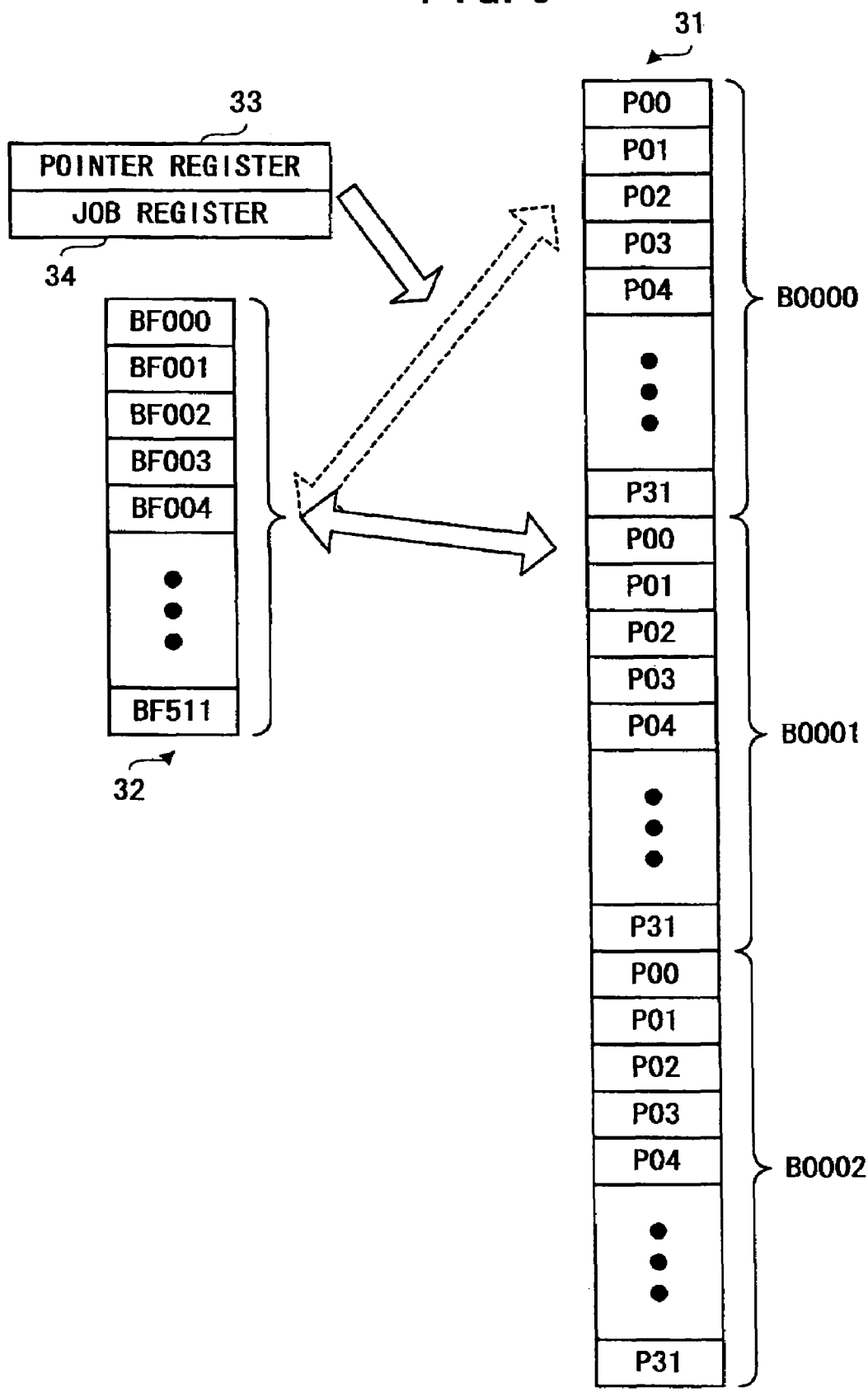
FIG. 6 is a schematic diagram of data exchange between a memory space of a flash memory and a buffer space of a buffer.

FIG. 6 schematically shows data exchange operation between the memory space 31 of the flash memory and a buffer space 32 of the buffer. The buffer space 32 shown in FIG. 6 is separated to 512 data regions (BF000 to BF511), wherein each data region is one byte. The buffer space 32 exchanges data with the flash memory 2 in a unit of one byte or in a unit of one word (2 bytes or more).

A pointer register 33 and a job register 34, shown in FIG. 6 store instructions from the host computer 4. Processing for reading data from the buffer 9 to the flash memory 2, and processing for writing data from the buffer 9 to the flash memory 2 is controlled by the flash sequencer block 12, in accordance with the instructions stored in the pointer register 33 and the job register 34. The pointer register 33 is for setting page addresses. The job register 34 is for setting operation instructions indicating data writing operation, etc.

As a first example, in a case where operation instructions set in the job register 34 indicates data reading operation, and a page address is set in the pointer register 33, information such as below, is set in the plurality of registers (not shown) that the flash sequencer block 12 comprises. First, an internal reading command is stored in a predetermined first register (not shown), which is set in the flash sequencer block 12, as an internal command. Second, a block address portion (logic block address) in a page address that is set in the pointer register 33 is converted to a corresponding block address (physical block address) in the flash memory 2. The converted page address is stored in a predetermined second register (not shown) in the flash sequencer block 12.

Based on the information set in the registers, the flash sequence block 12 controls the flash memory interface block 10 in accordance with the internal command. The flash memory interface block 10 supplies information indicating the internal command to the flash memory 2 via the internal bus 14. In the flash memory 2, stored data is sequentially read out in a unit of one byte, from data regions (A000 to A511) that correspond to the page address set in the second register of the flash sequencer block 12, in response to information output from the flash memory interface block 10. Data read from the flash memory 2 are sequentially stored in data regions (BF000 to BF511) of the buffer space 32. For example, the flash sequencer block 12 controls the flash memory interface block 10, so as to sequentially store data received from the flash memory 2 to data regions (BF000 to BF511) of the buffer space 32, in an order from a start address to an end address of the buffer space 32.

As a second example, in a case where operation instructions set in the job register 34 indicates data writing operation, and a page address is set in the pointer register 33, information such as below, is set in the plurality of registers (not shown) that the flash sequencer block 12 comprises. First, an internal writing command is stored in the first register (not shown) in the flash sequencer block 12, as an internal command. Second, a page address is generated based on page number portions that are the five lowest bits of the page address set in the pointer register 33 and the block address (physical block address) of the writing candidate block. The generated page address is stored in the second register (not shown) in the flash sequencer block 12.

Based on the information set in the registers, the flash sequencer block 12 controls the flash memory interface block 10 in accordance with the internal command. The flash memory interface block 10 supplies information indicating the internal command to the flash memory 2 via the internal bus 14. At the same time, the flash memory interface block 10 reads data stored in the data regions (BF000 to BF511) of the buffer space 32. Data read from the buffer space 32 is sequentially supplied to the flash memory 2, in a unit of one byte. For example, the flash sequencer block 12 controls the flash memory interface block 10, so as to read data for transferring to the flash memory 2 from the buffer space 32, in an order from a start address to an end address of the buffer space 32. In the flash memory 2, data supplied from the controller 3 is sequentially written into data regions (A000 to A511) that correspond to the page address set in second register of the flash sequencer block 12.

When the controller 3 exchanges sequential pages and data in the flash memory 2, "start page address" and "end page address" may be set in the pointer register 33. Page number portions, which are the five lowest bits of the page address set in the second register in the flash sequencer block 12, counts up by one from the "start page address" to the "end page address". As a different setting, the "start page address" and the "number of pages" may be set in the pointer register 33. In this setting, the page number portions set in the second register in the flash sequencer 12 counts up by one, from the "start page address". The count up operation is carried out until a number of tines that corresponds to "number of pages".

Processing for reading data stored in the flash memory 2 to the host computer 4, and processing for writing data from the host computer 4 to the flash memory 2 will be described.

Figure 7:
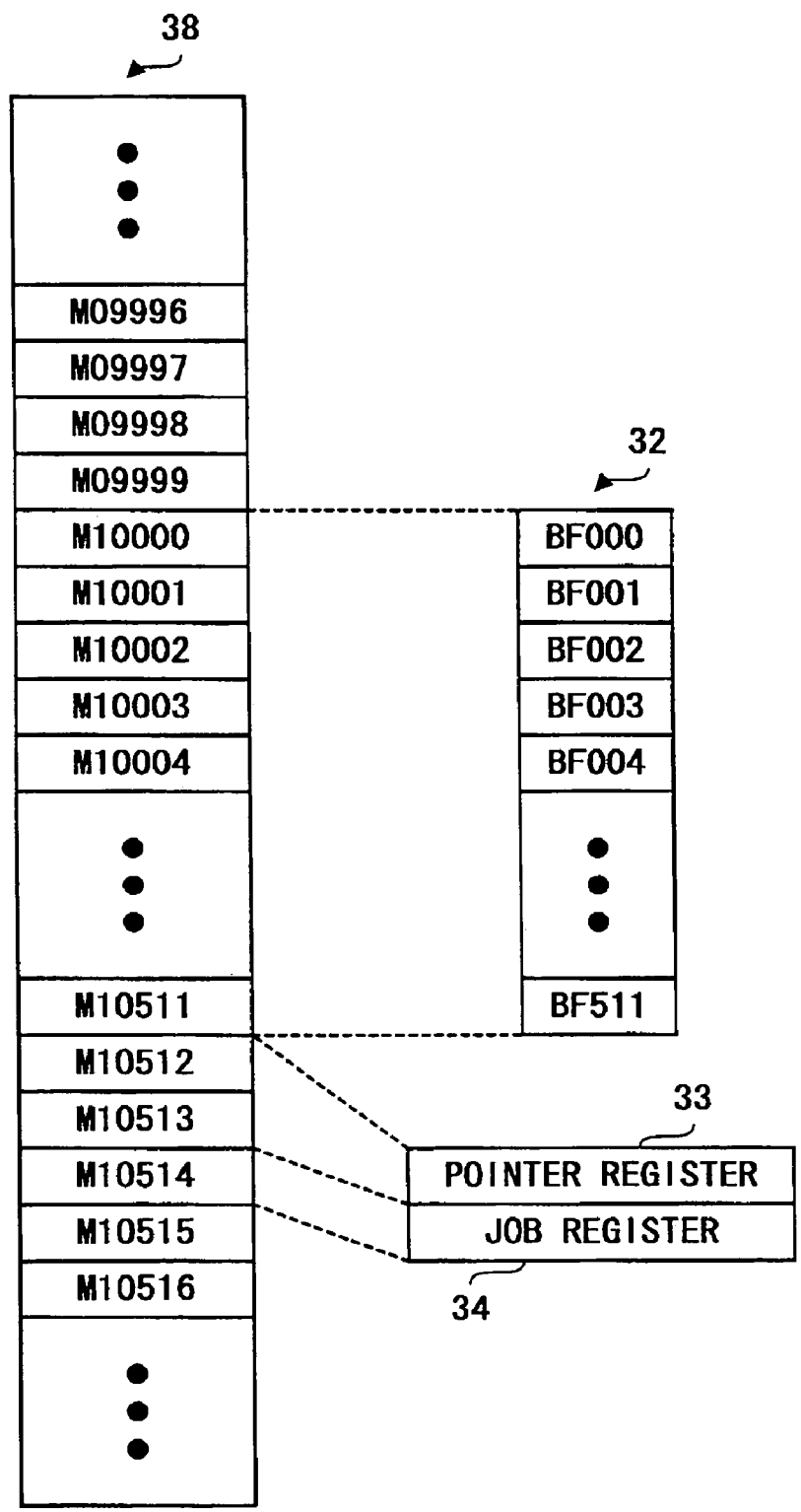
FIG. 7 is a schematic diagram of data exchange between a memory address space of a host computer and a buffer space of a buffer.

FIG. 7 schematically shows data exchange operation between a memory address space 38 of the host computer 4 and the buffer space 32 of the buffer 9. In FIG. 7, the pointer register 33 and the job register 34 are also shown.

The buffer space 32 of the buffer 9 is allotted to memory regions (M10000 to M10512) that have 512 bytes, in the memory address space 38 of the host computer 4. Addresses for accessing to the pointer register 33 and the job register 34 are included in the memory address space 38 of the host computer 4. The addresses allotted to the pointer register 33 and the job register 34 in the memory address space 38 may be adequately set, in accordance with data capacity of the pointer register 33 and the job register 34. The addresses allotted to the pointer register 33 and the job register 34 in the memory address space 38 may be included in an I/O address space of the host computer 4.

Figure 8:
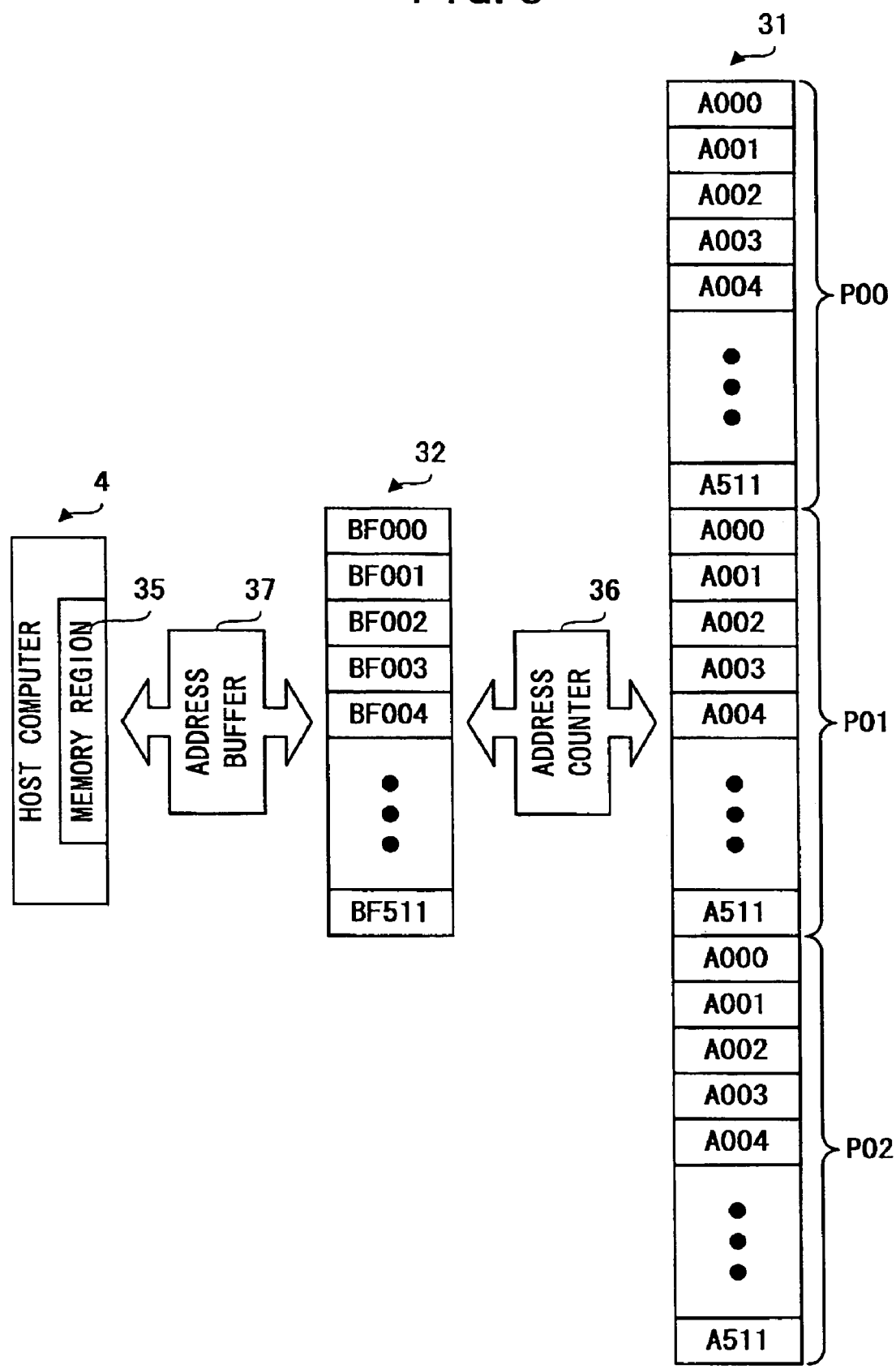
FIG. 8 is a schematic diagram of data exchange between a memory region of a host computer and a memory space of a flash memory.

FIG. 8 schematically shows data exchange operation of a memory region 35 of the host computer 4 and the memory space 31 of the flash memory 2. Data read from the flash memory 2 and data to be written into the flash memory 2 is exchanged between the memory region 35 and the memory space 32, via the buffer space 32 of the buffer 9. The buffer space 32 is allotted to the memory region 35 that has 512 bytes, in the memory address space 38 of the host computer 4. To read the data stored in the memory space 31 of the flash memory 2, and to write data into the memory space 31 of the flash memory 2, the host computer 4 accesses to the memory region 35 allotted to the buffer space 32. The controller 3 makes data exchange between the entire data region of the buffer space 32 and the memory space 31 possible, based on setting information in the pointer register 33 and the job register 34.

When the controller 3 exchanges data between the buffer space 32 and the memory space 31 of the memory 2, an address counter 36 included in the controller 3, is set so that data of one page (512 bytes) is sequentially exchanged. For example, the address counter 36 is included in the flash sequencer 12. On the other hand, in a case where data is exchanged between the host computer 4 and the buffer 9, by using an address buffer 37, in the same way as a common static RAM, each data region in the buffer space 32 that has 512 bytes, is randomly accessed, based on address signals and control signals supplied from a predetermined address bus. For example, the address buffer 37 is included in the host interface control block 5.

Data capacity of the buffer space 32 is 512 (=$2^9$) bytes. Therefore, each data region of the buffer space 32 can be specified by an address of 9 bits. The lowest 9 bits of the address data supplied from the memory region 35 of the host computer 4, indicate address of each data region in the buffer space 32. Data indicating the address of each data region in the buffer space 32 is set in the address buffer 37. The host interface control block 5 makes access to each data region of the buffer space 32 possible by the host computer 4, based on the address data set in the address buffer 37. Among the address data supplied from the memory region 35 to the host computer 4, data that is not set in the address buffer 37, is used for determining whether data maintained in the buffer space 32 matches with a request from the host computer 4. This determining processing is carried out by for example, the micro processor 6.

In a case where the host computer 4 accesses to the buffer space 32 in a word (16 bits) unit, the lowest eight bits of the address data supplied by the memory space 35 of the host computer 4 may be set in the address buffer 37. Each data region of the buffer space 32 can be specified by an address of eight bits. At this time also, based on data that is not set in the address buffer 37, among the address data supplied from the memory region 35 to the host computer 4, the controller 3 can determine whether data maintained in the buffer space 32 matches with a request from the host computer 4.

Data reading operation by the memory region 35 the host computer 4 from the buffer space 32 and data writing operation to the buffer space 32 will be described with reference to the timing charts shown in FIGS. 9 to 12.

Figure 9:
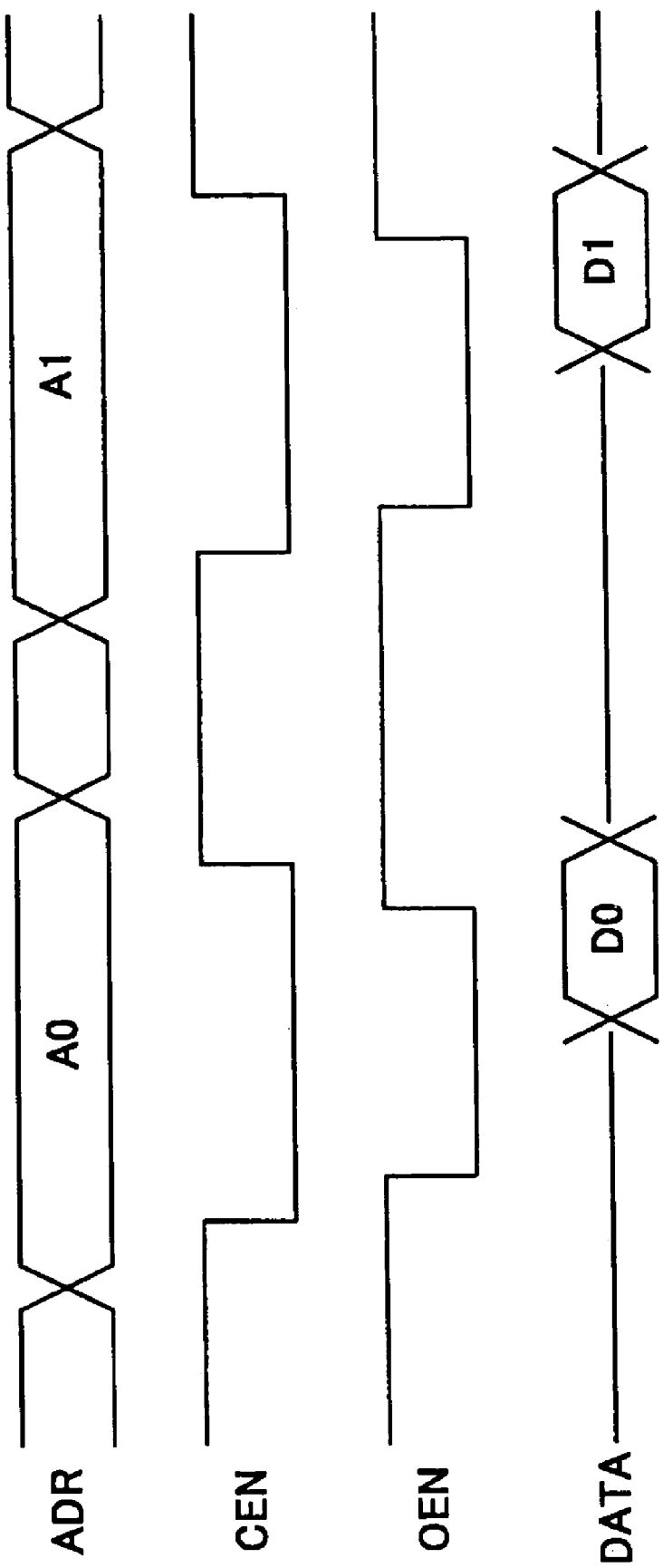
FIG. 9 is a timing chart showing data reading cycle in a memory region in a host computer.

FIG. 9 is a timing chart showing a data reading cycle in the memory region 35 of the host computer 4. The host computer 4 outputs an address signal to a predetermined address bus via the memory region 35. A chip enable signal CEN and an output enable signal OEN becomes low level, in accordance with the output. In the buffer 9, data stored in the data region of the buffer space 32 that has an address designated by the address signal ADR supplied from the host computer 4, is read. The read data is output to the host computer 4 as data signal DATA, via the host interface block 7. The host interface control block 5 controls the host interface block 7, so as to read stored data from the data region of the buffer space 32 that has the address designated by the address signal ADR, which is supplied from the host computer 4, for outputting data signal DATA to the host computer 4. In FIG. 9, data signal DATA indicating data D0 is output, in response to address A0 being designated by the address signal ADR. Data signal DATA indicating data D1 is output, in response to address A1 being designated by the address signal ADR.

Figure 10:
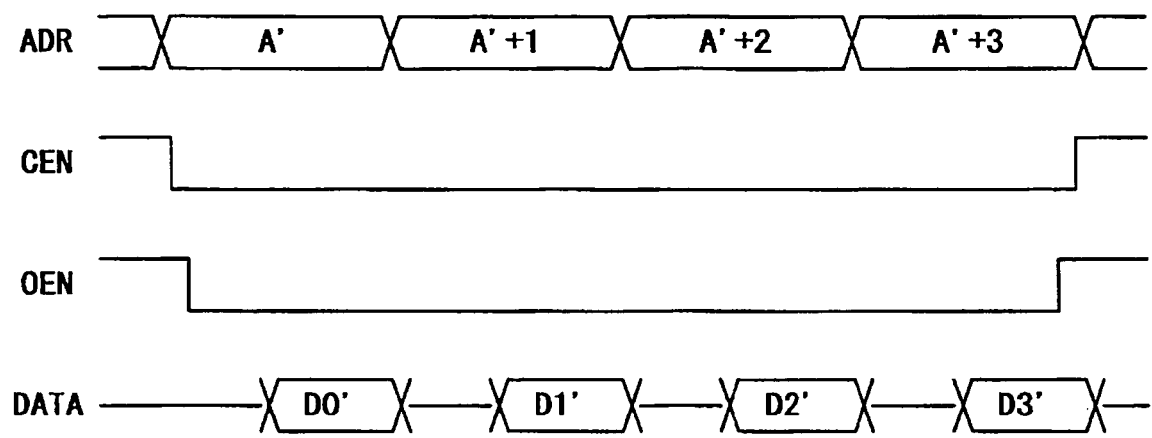
FIG. 10 is a timing chart showing a cycle for sequentially reading stored data from a buffer to a host computer.

FIG. 10 is a timing chart showing operation for the host computer 4 to sequentially read stored data from the buffer 9. In FIG. 10, the host computer 4 sequentially outputs address signals ADR indicating address A' to address A'+3, to the controller 3. During the period wherein the address signals ADR are sequentially output, the chip enable signal CEN and the output enable signal OEN is set at a low level. In the buffer 9, data stored in the data region of the buffer space 32 that has addresses A' to A'+3, designated by the address signal ADR, is sequentially read. The read data is sequentially output to the host computer 4, as data signal DATA. In FIG. 10, data signal DATA that indicates data D0' is output, in response to address A' being designated by the address signal ADR. Data signal DATA that indicates data D1' is output, in response to address A'+1 being designated by the address signal ADR. Data signal DATA that indicates data D2' is output, in response to address A'+2 being designated by the address signal ADR. Data signal DATA that indicates data D3' is output, in response to address A'+3 being designated by the address signal ADR.

Figure 11:
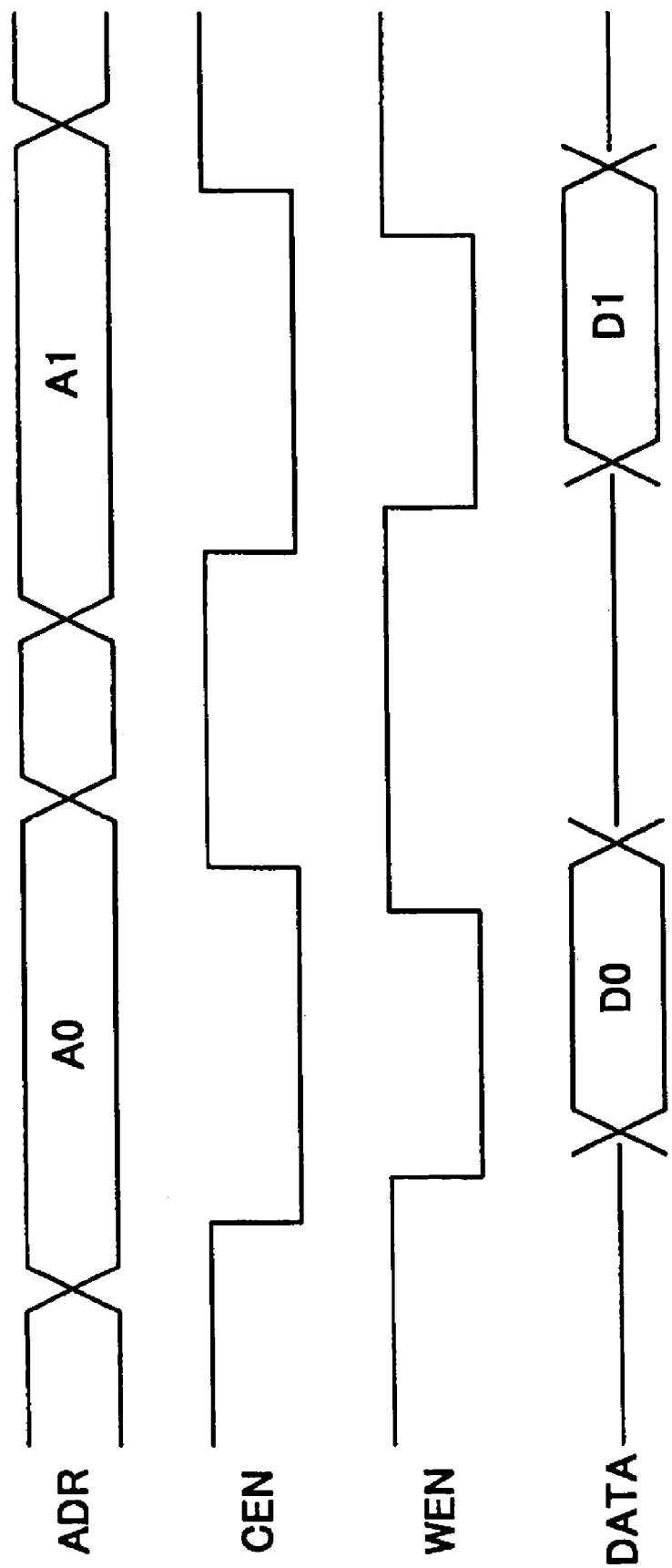
FIG. 11 is a timing chart showing data writing cycle in a memory region in a host computer.

FIG. 11 is a timing chart showing data writing cycle in the memory region 35 and the buffer space 32 of the buffer 9. The host computer 4 outputs an address signal ADR to a predetermined address bus via the memory region 35, and outputs data signal DATA to a predetermined data bus. Corresponding to the output of the address signal ADR and data signal DATA, the chip enable signal CEN is set at a low level. During the period when the address signal ADR, data signal DATA, and a low-level chip enable signal CEN are output, a write enable signal WEN is changed from a low level to a high level. Data signal DATA is populated to the data region of the buffer space 32 that has the address designated by the address signal ADR. The host interface control block 5 controls the host interface block 7, so as to write in data indicated by the data signal DATA supplied from the host computer 4, to data region of the memory space 32 that has the address designated by the address signal ADR supplied from the host computer 4. In FIG. 11, data D0 indicated by the data signal DATA is stored in the data region that has an address A0 designated by the address signal ADR. Data D1 indicated by the data signal DATA is stored in the data region that has an address A1 designated by the address signal ADR.

Figure 12:
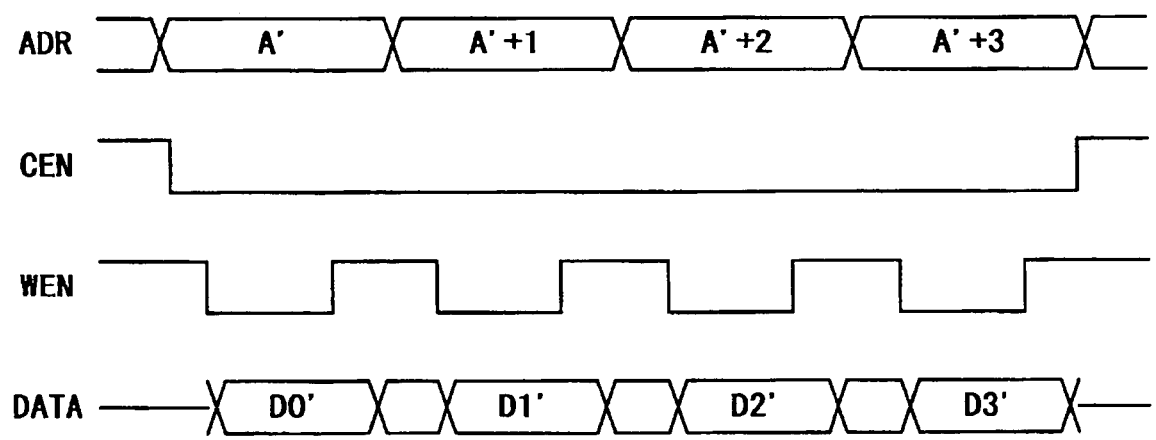
FIG. 12 is a timing chart showing a cycle for sequentially writing stored data by a host computer.

FIG. 12 is a timing chart showing operation for the host computer 4 to sequentially write data into the buffer 9. In FIG. 12, the host computer 4 sequentially outputs address signals ADR indicating address A' to adders A'+3, to the controller 3. In a case where the address signal ADR designating address A' is output, data signal DATA indicating data D0' is output. In a case where the address signal ADR designating address A'+1 is output, data signal DATA indicating data D1' is output. In a case where the address signal ADR designating address A'+2 is output, data signal DATA indicating data D2' is output. In a case where the address signal ADR designating address A'+3 is output, data signal DATA indicating data D3' is output. During the period when the address signal ADR is sequentially output, the chip enable signal CEN becomes a low level. During the period when the address signal ADR, data signal DATA and the low-level chip enable signal CEN is output, the host computer 4 makes the write enable signal WEN to a high level from a low level. Data signal DATA is populated to the data region of the buffer space 32 that has the address designated by the address signal ADR. In FIG. 12, data D0' indicated by the data signal DATA, is stored in the data region that has address A' designated by the address signal ADR. Data D1' indicated by the data signal DATA, is stored in the data region that has address A'+1, designated by the address signal ADR. Data D2' indicated by the data signal DATA, is stored in the data region that has address A'+2, designated by the address signal ADR. Data D3' indicated by the data signal DATA, is stored in the data region that has address A'+3, designated by the address signal ADR.

Between a page 31*b* (P00 to P31), which has a page address designated by the pointer register 33 in the memory space 31 of the flash memory 2, and the buffer space 32 of the buffer 9, data is sequentially exchanged from the beginning to end of the buffer space 32. In other words, data exchange between the flash memory 2 and the controller 3 is carried out, with the page in the flash memory 2 as one unit. The host computer 4 can exchange data randomly with an arbitrary data region included in the buffer space 32 of the buffer 9, by accessing to the memory region 35. The buffer space 32 of the buffer 9 has a memory capacity of 512 bytes, which is the same as one page in the memory space 31 of the flash memory 2. Therefore, the controller 3 can provide the host computer 4 with flexible access to the flash memory 2 in spite of the simple structure. Memory access to the flash memory 2 provided by the controller 3 is similar to access to a common static RAM.

Various embodiments and changes may be made thereunto without departing from the broad spirit and scope of the invention. For example, the controller 3 may control data exchange between the flash memory 2 and the host computer 4, independent from the flash memory system 1. The controller 3 may be built-in to the host computer 4. The pointer register 33 and the job register 34 may be replaced by an arbitrary memory, which makes random access from the host computer 4 possible.

The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-165656 filed on Jun. 10, 2003 and including specification, claims, drawings and summary. The disclosure of the above Japanese Patent Application is incorporated herein by reference in its entirety.

What is claimed is:

1. A memory controller for controlling access from a computer to a flash memory having a plurality of physical blocks based on address data from the computer, wherein each of the plurality of physical blocks is a minimum erasing unit and divided into a plurality of physical pages each of which is a processing unit in data reading operation and data writing operation carried out in the flash memory, the memory controller comprising:
    a buffer which stores data read from the flash memory or data to be written to the flash memory, wherein a range of a plurality of memory addresses corresponding to capacity of said buffer is assigned to said buffer within a memory address space of the computer;
    an address buffer which stores one of the plurality of memory addresses corresponding to a first portion of the address data;
    a first interface module which provides the computer with random access to each of all data regions of said buffer within the range of memory addresses assigned to said buffer in an access unit of the memory address space of the computer, by referring to said address buffer;
    an address register which stores a logical page address corresponding to a second portion of the address data, wherein the logical page address indicates a logical page for reading data from the flash memory to said buffer or for writing data from said buffer to the flash memory;
    a maintaining module which maintains a correspondence between at least parts of a plurality of logical block addresses and at least parts of a plurality of physical block addresses wherein the plurality of logical block addresses are allotted to all of a plurality of logical blocks respectively, each of the plurality of logical blocks is divided into a plurality of logical pages, the plurality of physical block addresses are allotted to all of the plurality of physical blocks respectively, and the correspondence between the logical block addresses and the physical block addresses dynamically changes each time data is re-written in the flash memory;
    an address generating module which generates a physical page address in accordance with the logical page address stored in said address register based on the correspondence maintained by said maintaining module; and
    a second interface module which controls data transfer between said buffer and one of the plurality of physical pages corresponding to the physical page address generated by said address generating module, wherein the data transfer is carried out with one of the plurality of physical pages as one unit.

2. The memory controller according to claim 1, wherein data capacity of said buffer is 512 bytes size.

3. The memory controller according to claim 1, wherein data capacity of said buffer is one-page size of the plurality of physical pages.

4. The memory controller according to claim 1, wherein said second interface module specifies one of the plurality of physical pages corresponding to the physical page address generated by said address generating module, as a source or destination of the data transfer.

5. A flash memory system comprising:
    a flash memory having a plurality of physical blocks, wherein each of the plurality of physical blocks is a minimum erasing unit and divided into a plurality of physical ages each of which is a processing unit in data reading operation and data writing operation carried out in the flash memory;
    a buffer which stores data read from said flash memory or data to be written to said flash memory, wherein a range of a plurality of memory addresses corresponding to capacity of said buffer is assigned to said buffer within a memory address space of a computer;
    an address buffer which stores one of the plurality of memory addresses corresponding to a first portion of the address data from the computer;
    a first interface module which provides the computer with random access to each of all data regions of said buffer within the range of memory addresses assigned to said buffer in an access unit of the memory address space of the computer, by referring to said address buffer;
    an address register which stores a logical page address corresponding to a second portion of the address data, wherein the logical page address indicates a logical page for reading data from the flash memory to said buffer or for writing data from said buffer to the flash memory;
    a maintaining module which maintains a correspondence between at least parts of a plurality of logical block addresses and at least parts of a plurality of physical block addresses, wherein the plurality of logical block addresses are allotted to all of a plurality of logical blocks respectively, each of the plurality of logical blocks is divided into a plurality of logical pages, the plurality of physical block addresses are allotted to all of the plurality of physical blocks respectively, and the correspondence between the logical block addresses and the physical block addresses dynamically changes each time data is re-written in the flash memory;
    an address generating module which generates a physical page address in accordance with the logical page address stored in said address register based on the correspondence maintained by said maintaining module; and
    a second interface module which controls data transfer between said buffer and one of the plurality of physical pages corresponding to the physical page address generated by said address generating module, wherein the data transfer is carried out with one of the plurality of physical pages as one unit.

6. The flash memory system according to claim 5, wherein data capacity of said buffer is 512 bytes size.

7. The flash memory system according to claim 5, wherein data capacity of said buffer is one-page size of the plurality of physical pages.

8. The flash memory system according to claim 5, wherein said second interface module specifies one of the plurality of physical pages corresponding to the physical page address generated by said address generating module, as a source or destination of the data transfer.

9. A method for controlling access from a computer to a flash memory having a plurality of physical blocks based on address data from the computer, wherein each of the plurality of physical blocks is a minimum erasing unit and divided into a plurality of physical pages each of which is a processing unit in data reading operation and data writing operation carried out in the flash memory, the method comprising:

storing data read from the flash memory or data to be written in the flash memory, into a buffer, wherein a range of a plurality of memory addresses corresponding to capacity of the buffer is assigned to the buffer within a memory address space of the computer;

storing one of the plurality of memory addresses corresponding to a first portion of the address data, into an address buffer;

storing a logical page address corresponding to a second portion in the address data, into an address register, wherein the logical page address indicates a logical page for reading data from the flash memory to said buffer or for writing data from said buffer to the flash memory;

maintaining a correspondence between at least parts of a plurality of logical block addresses and at least parts of a plurality of physical block addresses wherein the plurality of logical block addresses are allotted to all of a plurality of logical blocks respectively, each of the plurality of logical blocks is divided into a plurality of logical pages, the plurality of physical block addresses are allotted to all of the plurality of physical blocks respectively, and the correspondence between the logical block addresses and the physical block addresses dynamically changes each time data is re-written in the flash memory;

generating a physical page address in accordance with the logical page address stored in the address register based on the correspondence;

controlling data transfer between the buffer and one of the plurality of physical pages corresponding to the physical page address, wherein the data transfer is carried out with one of the plurality of physical pages as one unit; and providing the computer with random access to each of all data regions of said buffer within the range of memory addresses assigned to said buffer in an access unit of the memory address space of the computer, by referring to said address buffer.

10. The method according to claim 9, wherein data capacity of the buffer is 512 bytes size.

11. The method according to claim 9, wherein data capacity of the buffer is one-page size of the plurality of physical pages.

12. The method according to claim 9, further comprising:

specifying one of the plurality of physical pages corresponding to the physical page address as a source or destination of the data transfer.

* * * * *

UNITED STATES PATENT AND TRADEMARK OFFICE
CERTIFICATE OF CORRECTION

PATENT NO. : 7,606,993 B2  Page 1 of 1
APPLICATION NO. : 10/794480
DATED : October 20, 2009
INVENTOR(S) : Oyaizu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 116 days.

Signed and Sealed this

Twelfth Day of October, 2010

David J. Kappos
*Director of the United States Patent and Trademark Office*